United States Patent
Bansal et al.

(10) Patent No.: US 8,266,204 B2
(45) Date of Patent: Sep. 11, 2012

(54) DIRECT ADDRESSABILITY AND DIRECT SERVER RETURN

(75) Inventors: Deepak Bansal, Redmond, WA (US); Priyank Ramesh Warkhede, Redmond, WA (US); Thiruvengadam Venketesan, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 88 days.

(21) Appl. No.: 12/723,994

(22) Filed: Mar. 15, 2010

(65) Prior Publication Data

US 2011/0225231 A1 Sep. 15, 2011

(51) Int. Cl.
*G06F 15/16* (2006.01)
(52) U.S. Cl. ........................................ 709/203; 709/245
(58) Field of Classification Search .................. 709/203, 709/245
See application file for complete search history.

(56) References Cited

U.S. PATENT DOCUMENTS

| | | | |
|---|---|---|---|
| 6,151,322 A | 11/2000 | Viswanath | |
| 6,639,901 B1 | 10/2003 | Katzri | |
| 7,062,559 B2 | 6/2006 | Yoshimura | |
| 2005/0005006 A1* | 1/2005 | Chauffour et al. | 709/223 |
| 2006/0085851 A1 | 4/2006 | Heninger | |
| 2006/0218243 A1* | 9/2006 | Kudo et al. | 709/218 |

OTHER PUBLICATIONS

VMware Infrastructure 3 in a Cisco Network Environment—Published Date: May 28, 2008 http://www.vmware.com/files/pdf/vmi_cisco_network_environment.pdf.
Understanding Hyper-V Virtual Networks—Part 1—Switching basic Concepts—Published Date: Mar. 10, 2009 http://blogs.technet.com/apb/archive/2009/03/10/understanding-hyper-v-virtual-networks-internally.aspx.
Host Virtual LAN (VLAN) support in Hyper-V (802.1Q)—Published Date: Oct. 25, 2008 http://www.gilham.org/Blog/Lists/Posts/Post.aspx?List=aab85845%2D88d2%2D4091%2D8088%2Da6bbce0a4304&ID=324.
Implementing IBM Powervm Virtual Machines on Juniper Networks Data Center Networks—Published Date: Oct. 2009 http://www.juniper.net/us/en/local/pdf/implementation-guides/8010049-en.pdf.

* cited by examiner

*Primary Examiner* — Brian P Whipple
(74) *Attorney, Agent, or Firm* — Shook, Hardy & Bacon L.L.P.

(57) ABSTRACT

Cloud computing platforms having computer-readable media that perform methods for direct addressability and direct server return are provided. The cloud computing platform includes a load balancer and several servers. The servers are configured with public addresses, private addresses, and an address of the load balancer. The loopback interface of the servers is configured with the address of the load balancer. This allows a server to bypass the load balancer when replying to communication messages. Additionally, the public and private addresses of the servers enable direct addressability in the cloud computing platform. Accordingly, an application executing in the cloud computing platform may connect two or more clients on the same server.

9 Claims, 4 Drawing Sheets

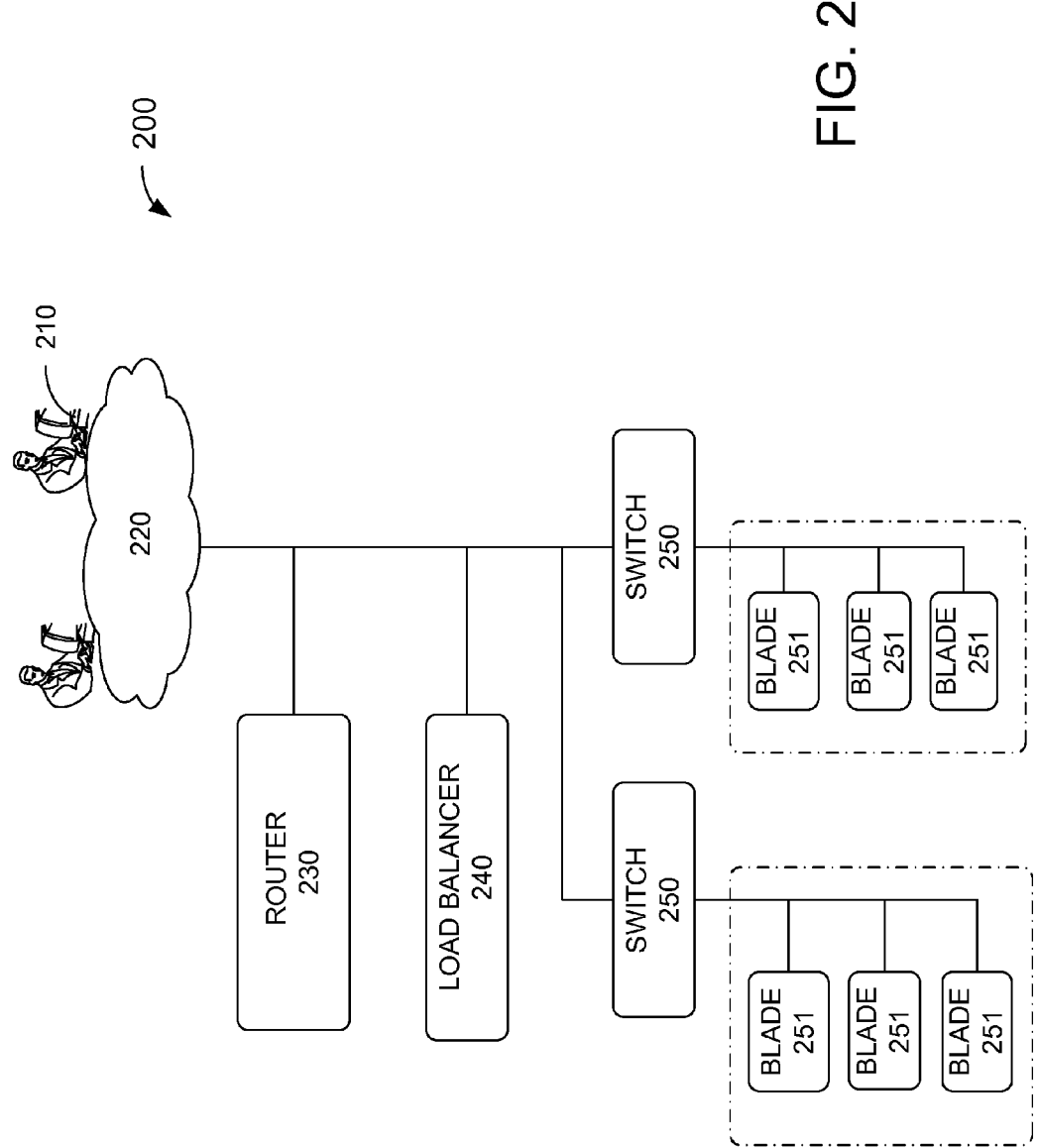

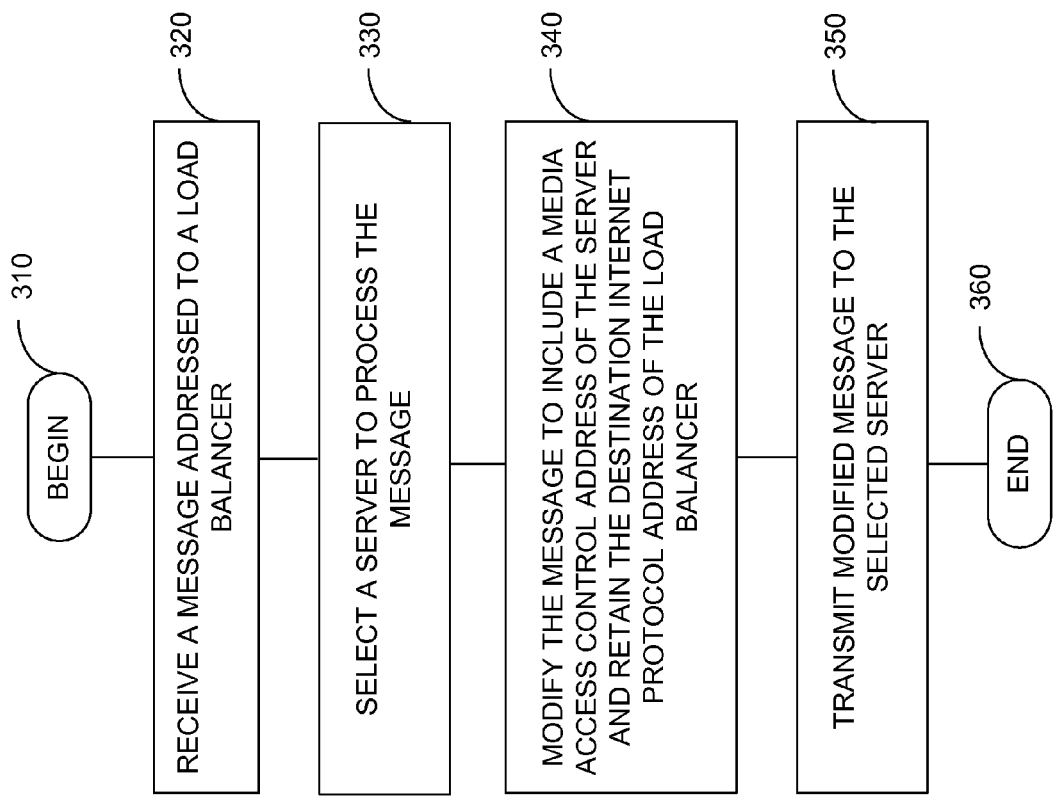

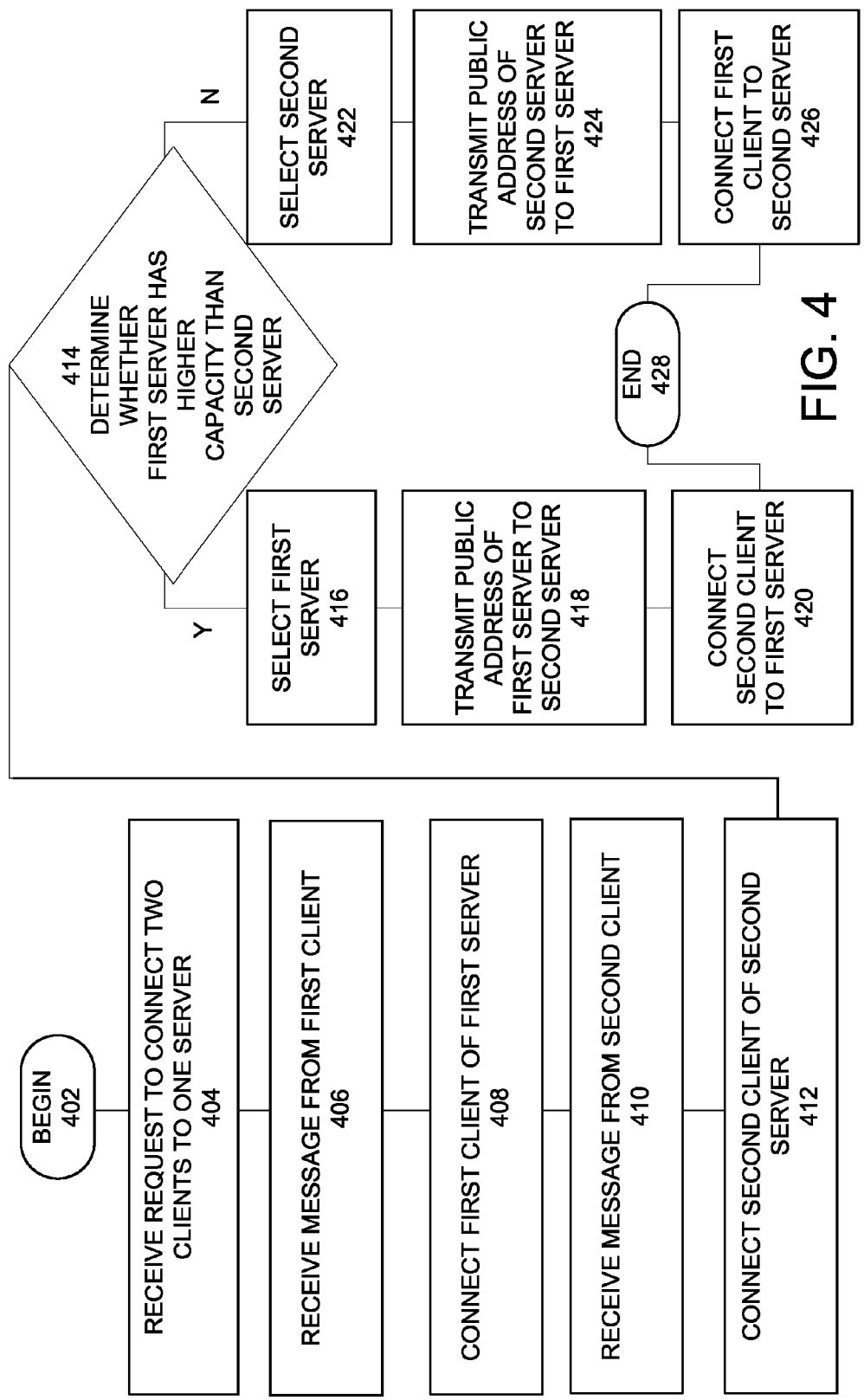

DIRECT ADDRESSABILITY AND DIRECT SERVER RETURN

BACKGROUND

Conventionally, cloud computing platforms host software applications in an Internet-accessible virtual environment. The cloud computing platform allows an organization to use datacenters designed and maintained by third parties. The conventional virtual environment supplies small or large organizations with requested hardware resources, software resources, network resources, and storage resources. The virtual environment also provides application security, application reliability, application scalability, and availability.

The conventional datacenters provide the physical computing resources, physical storage resources, and physical network resources. The physical resources in the data center are virtualized and exposed to the organizations as a set of application programming interfaces. The organizations do not need to maintain their own hardware resources or software resources, or maintain datacenters that are reliable and scalable.

The organizations may access these physical resources efficiently through the virtual environment without knowing the details of the software or the underlying physical hardware. The conventional data centers utilize virtual private network configurations that prevent direct internet protocol (IP) addressing and direct server return. Thus, cloud applications that attempt to use direct IP addressing or direct server return fail to execute properly in conventional datacenters.

SUMMARY

Embodiments of the invention relate, in one regard, to cloud computing platforms, computer-readable media, and computer-implemented methods that provide direct IP addressing and direct server return in a cloud computing platform. The cloud computing platform includes a load balancer and a collection of servers that process messages from client devices that communicate with the cloud computing platform.

The servers are configured to process the messages received from the client devices. In one embodiment, the servers are configured with a public network interface, a private network interface, and a loopback interface. The loopback interface of the servers may be assigned the address of the load balancer.

The load balancer ensures that the servers distribute processing of messages among the servers. The load balancer is configured to receive a message and to select a server from the group of servers to process the message. In turn, the load balancer changes the destination media access control address of the message to the media access control address of the server without altering the destination internet protocol address, i.e, the load balancer's internet protocol address, of the message. The load balancer transmits the modified message to the selected server. The selected server sends a reply to the source of the message. The reply bypasses the load balancer. Accordingly, the load balancer is configured to provide direct server return.

Additionally, the servers are configured with a public address on the public interface. The server's public address may be shared with the client devices to allow multiple clients to connect to the same server. Accordingly, the servers provide direct addressability when an application requires multiple client devices to connect to the same server.

This summary is provided to introduce a selection of concepts, in a simplified form, that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

FIG. 2 is a block diagram that illustrates an exemplary load balancer and exemplary servers in the exemplary cloud computing platform in accordance with embodiments of the invention;

FIG. 3 is a logic diagram that illustrates an exemplary method to perform direct server return in the cloud computing platform in accordance with embodiments of the invention; and FIG. 4 is a logic diagram that illustrates an exemplary method to perform direct addressability in the cloud computing platform in accordance with embodiments of the invention.

DETAILED DESCRIPTION

Figure 1:
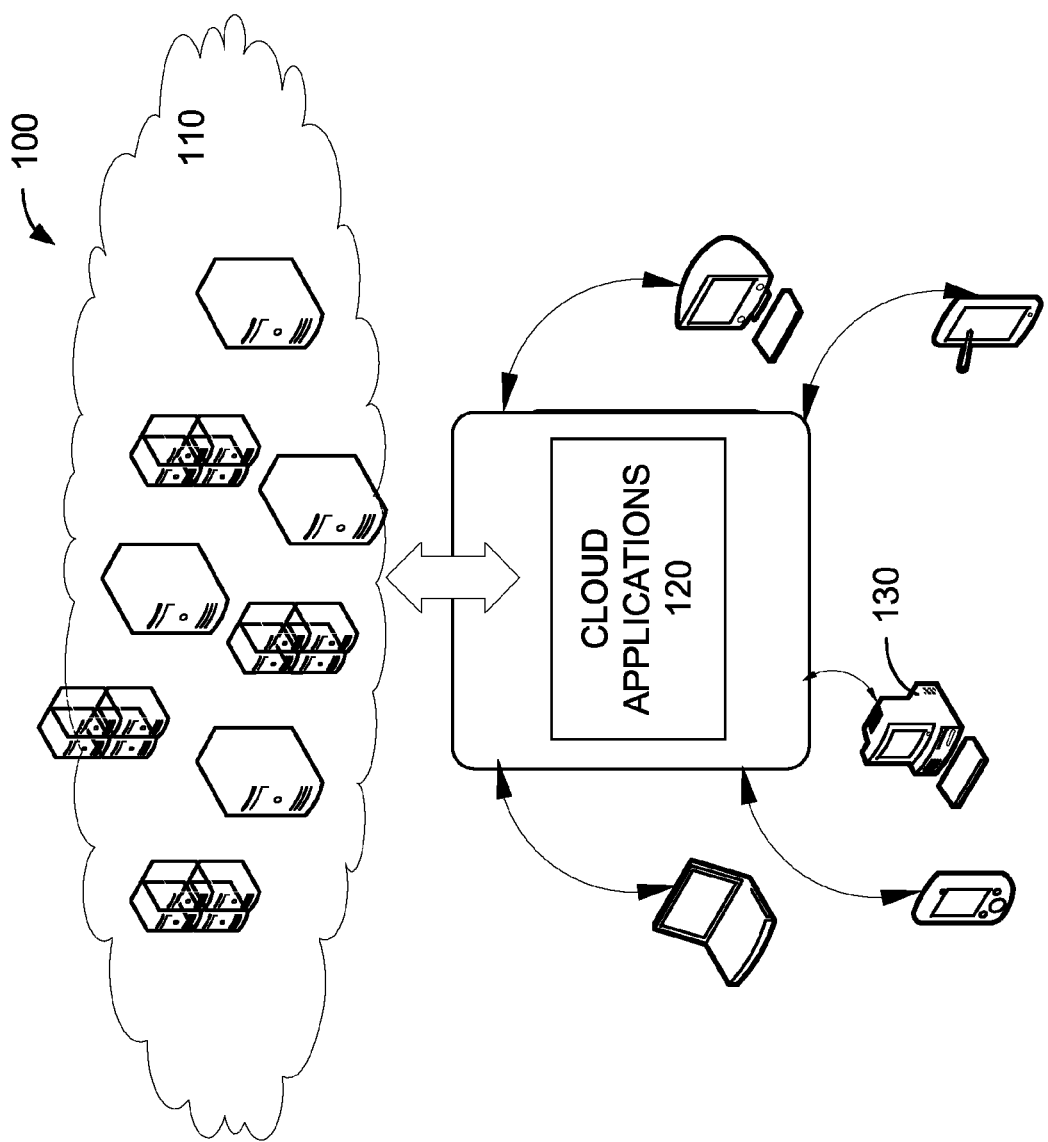
FIG. 1 is a network diagram that illustrates an exemplary cloud computing platform in accordance with embodiments of the invention.

This patent describes the subject matter for patenting with specificity to meet statutory requirements. However, the description itself is not intended to limit the scope of this patent. Rather, the inventors have contemplated that the claimed subject matter might also be embodied in other ways, to include different steps or combinations of steps similar to the ones described in this patent, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described. Further, embodiments are described in detail below with reference to the attached drawing figures, which are incorporated in their entirety by reference herein.

As utilized herein, the term "component" refers to any combination of firmware, hardware, and software.

A cloud computing platform is configured to perform direct addressability and direct server return. Direct addressability is a mechanism that provides direct access to servers in a cloud computing platform. Each server is associated with a public network and is configured with a public address. In certain embodiments, the address is an internet protocol (IP) address that allows a client device to connect directly to the server. Thus, applications executing in the cloud computing platform may request that multiple client devices connect to the same server. The public addresses of the servers are communicated among the client devices to allow multiple client devices to connect to the same server.

Direct server return is a mechanism that optimizes load balanced access to servers in the cloud computing platform. A load balancer connected to the servers receives a message from a client device. In turn, the load balancer selects a server to process the message. The message is transmitted to the server, which processes the message and responds with a reply message. The reply message from the server bypasses the load balancer and is routed to the client device, the source of the message received by the load balancer, without traversing the load balancer on the reply path. In certain embodiments, the reply message is transmitted from a loopback interface of the server and is configured with a source internet protocol address that is set to the internet protocol address of the load balancer instead of the internet protocol address of the server. Accordingly, the cloud computing platform provides both direct addressability and direct server return.

As one skilled in the art will appreciate, the cloud computing platform may include hardware, software, or a combination of hardware and software. The hardware includes processors and memories configured to execute instructions stored in the memories. In one embodiment, the memories include computer-readable media that store a computer-program product having computer-useable instructions for a computer-implemented method. Computer-readable media include both volatile and nonvolatile media, removable and nonremovable media, and media readable by a database, a switch, and various other network devices. Network switches, routers, and related components are conventional in nature, as are means of communicating with the same. By way of example, and not limitation, computer-readable media comprise computer-storage media and communications media. Computer-storage media, or machine-readable media, include media implemented in any method or technology for storing information. Examples of stored information include computer-useable instructions, data structures, program modules, and other data representations. Computer-storage media include, but are not limited to, random access memory (RAM), read only memory (ROM), electrically erasable programmable read only memory (EEPROM), flash memory or other memory technology, compact-disc read only memory (CD-ROM), digital versatile discs (DVD), holographic media or other optical disc storage, magnetic cassettes, magnetic tape, magnetic disk storage, and other magnetic storage devices. These memory technologies can store data momentarily, temporarily, or permanently.

In one embodiment, the cloud computing platform includes cloud applications that are available to client devices. The client devices access the cloud computing platform to execute the cloud applications. The cloud applications are implemented using storage and processing resources available in the cloud computing platform.

FIG. 1 is a network diagram that illustrates an exemplary computing system 100 in accordance with embodiments of the invention. The computing system 100 shown in FIG. 1 is merely exemplary and is not intended to suggest any limitation as to scope or functionality. Embodiments of the invention are operable with numerous other configurations. With reference to FIG. 1, the computing system 100 includes a cloud computing platform 110, cloud applications 120, and client devices 130.

The cloud computing platform 110 is configured to execute cloud applications 120 requested by the client devices 130. The cloud computing platform 110 connects to the client devices 130 via a communications network, such as a wireless network, local area network, wired network, or the Internet.

The cloud applications 120 are available to the client devices 130. The software executed on the cloud computing platform 110 implements the cloud applications 120. In one embodiment, virtual machines in the cloud computing platform 110 execute the cloud applications 120. The cloud applications 120 may include editing applications, network management applications, finance applications, or any application requested or developed by the client devices 130. A cloud application 120 may require that multiple client devices 130 connect to a single server of the cloud computing platform 110. The direct addressability mechanism implemented by the cloud computing platform 110 allows the client devices 130 to connect to a selected server. In certain embodiments, some functionality of the cloud application 120 may be executed on the client devices 130.

The client devices 130 are utilized by a user to interact with cloud applications 120 provided by the cloud computing platform 110. The client devices 130, in some embodiments, must register with the cloud computing platform 110 to access the cloud applications 120. Any client device 130 with an account from the cloud computing platform 110 may access the cloud applications 120 and other resources provided in the cloud computing platform 110. The client devices 130 include, without limitation, personal digital assistants, smart phones, laptops, personal computers, gaming systems, set-top boxes, or any other suitable client computing device. The client devices 130 include user and system information storage to store user and system information on the client devices 130. The user information may include search histories, cookies, and passwords. The system information may include internet protocol addresses, cached Web pages, and system utilization. The client devices 130 communicate with the cloud computing platform 110 to receive results from the cloud applications 120.

Accordingly, the computing system 100 is configured with a cloud computing platform 110 that provides cloud applications 120 to the client devices 130. The cloud applications 120 remove the burden of updating and managing multiple local client applications on the client devices 130.

In certain embodiments, the cloud computing platform provides a collection of servers and a load balancer. The load balancer distributes messages among the servers. The load balancer attempts to prevent the servers from being overloaded. In some embodiments, the load balancer and servers are configured to provide direct server return and direct addressability to optimize the cloud computing platform.

FIG. 2 is a block diagram that illustrates an exemplary load balancer 240 and exemplary servers 251 in the exemplary cloud computing platform 200 in accordance with embodiments of the invention. Client devices 210 connect to servers 251 over a network 220. The network 220 connects a router 230, load balancer 240, switches 250, and servers 251.

The client devices 210 create communication messages that are transmitted on network 220. The communication messages are transmitted to the servers 251 via the load balancer 240. In one embodiment, the communication messages created by the client devices 210 are packets having a destination that includes an internet protocol address of the client. The internet protocol address may include a public address or a private address associated with the load balancer.

The network 220 may include a private network and a public network. The private network is identified using private addresses, and the public network is addressed using public addresses. The client devices 210, router 230, load balancer 240, switch 250, and the server 251 connect to the network and are assigned an internet protocol address. The network 220 transmits communication messages among the client devices 210, router 230, load balancer 240, switch 250 and the servers 251.

The router 230 receives a communication message from the client device. In turn, the router 230 parses the communication message to identify the destination of the communication message. When the destination specifies the public internet protocol address of the load balancer 240, the router 230 transmits the communication message to the load balancer. When the communication message specifies an address that is not readily identifiable in a look-up table maintained by the route 230, the communication message is transmitted to a default router for further processing.

The load balancer 240 distributes the processing workload among the servers 251. The load balancer 240 may be configured with a public address and a private address. In one embodiment, the load balancer 240 may receive the communication messages from the client devices 210 over an interface associated with the public address of the load balancer 240. In turn, the load balancer 240 selects a server 251 to process the message based on the relative processing and bandwidth capacities at the servers 251. The server 251 with the most available capacity is selected to process the message. The load balancer 240 modifies the communication message by changing the destination media access control address. The destination media access control address of the communication message is changed to the media access control address of the selected server 251. In turn, the communication message is transmitted to the selected server 251 via switch 250.

The switch 250 routes the communication message to the servers 251 selected by the load balancer 240. In some embodiments, the switch tags the communication message with an identifier. The identifier may include a term, such as "public" for communication messages that are communicated over a public network interface and "private" for communications that are transmitted over a private network interface. The switch 250 may also be configured, in a default mode, to tag each received communication message as private. The switch 250 may also select a private tag when the source of the communication message is on the private network. The switch 250 may select a public tag when the source of the communication message is on the public network. In one embodiment, the switch is a top of rack switch.

The servers 251 process the communication message and transmit the response to the client devices 210. In some embodiments, the response may be returned from the servers 251 without traversing the load balancer. The servers 251 are configured with public addresses, private addresses, and the load balancer address. The server 251 checks the destination address to ensure that it matches at least one of the internet protocol addresses associated with the server 251. Each server 251 may include three internet protocol addresses. The first internet protocol address may be a private address that is used by the server 251 to communicate over the private network. The second address is a public address that is used by the server to communicate over the public network and to provide direct addressability. The third address is the load balancer address, which is used by the server 251 to implement the direct server return. However, when an address resolution protocol request identifying the load balancer address is transmitted on the public network or private network, the servers 251 do not respond. This prevents conflicts between the load balancer 240 and the servers 251.

In some embodiments, a first network interface on the server 251 configured the with first address receives communication messages from the load balancer 240. A second network interface on the server 251 configured with the second address receives communication messages from client devices 210 on the Internet. The loopback interface is used to prevent discarding of communication messages that have destination addresses set as the address for the load balancer. Accordingly, the server is configured with weak routing to allow the first network interface and the second network interface to receive communication messages having destination addresses set as the address of the load balancer 240.

In one embodiment, the servers 251 may execute virtualization technology that creates a virtual network having virtual switches that connect multiple virtual machines. The virtual switches may operate similar to switch 250 and the virtual machines may operate similar to servers 251. In some embodiments, the virtual switches tag only the communication messages for the public network and the switches 250 tag only the communication messages for the private network. The virtual switches and switches 250 may be configured to connect to multiple private networks and one public network.

The servers in the cloud computing platform may implement direct server return. The direct server return bypasses the load balancer in the reply path when responding to a communication message from a client device. Direct server return reduces the number of messages that are created in the reply path. It may also decrease the round trip reply time calculated by the client device that sent the communication message.

FIG. 3 is a logic diagram that illustrates an exemplary method to perform direct server return in the cloud computing platform in accordance with embodiments of the invention. The method begins in step 310 when a source transmits a communication message. The source is a client device of the cloud computing platform that generates the message and addresses the message to the load balancer. The client device is connected to a public network.

In step 320, the communication message addressed to a public interface of a load balancer connected to multiple servers is received by the load balancer. In step 330, the load balancer selects one of the servers to process the communication message. The message is modified by the load balancer to include a media access control address of the selected server as the destination media access control address and to retain the internet protocol address of the load balancer as the destination internet protocol address of the message, in step 340. In step 350, the load balancer transmits the modified message to the selected server associated with the destination media access control address.

The selected server has a loopback interface configured to match the internet protocol address of the load balancer. The loopback interface does not respond to address resolution protocol requests that specify the internet protocol address of the load balancer. The load balancer responds to the address resolution protocol requests that specify the internet protocol address of the load balancer.

The selected server has an interface to a private network and an interface to a public network. The server communicates a reply to the source without traversing the load balancer in the reply route. The servers may include physical servers or virtual servers. The method ends in step 360.

In certain embodiments, the servers are configured to provide direct addressability. The public interfaces of the server may allow an application to connect multiple client devices to the same server. The cloud computing platform selects the server with the most capacity to process the communication messages from multiple clients. The client devices use the public address to connect to the server selected by the cloud computing platform.

FIG. 4 is a logic diagram that illustrates an exemplary method to perform direct addressability in the cloud computing platform in accordance with embodiments of the invention. A computer-storage medium storing computer usable instructions may perform this method. The method begins in step 402 when the application is initialized. In step 404, a request, from an application executing in the cloud computing platform, to connect at least two clients to the same server is received by a fabric controller. In turn, a message from a first client is received by the fabric controller, in step 406. The fabric controller connects the first client to a first server in step 408. In step 410, a message is received by the fabric controller from a second client. In step 412, the fabric controller connects the second client to a second server. In step 414, the fabric controller determines whether the first server has more capacity than the second server. In certain embodiments, the first server and second server include private interfaces that connect to a private network and public interfaces that connect to a public network.

When the first server has more capacity, the first server is selected by the fabric controller, in step 416. In step 418, the fabric controller transmits the public address of the first server to the second client. In step 420, the fabric controller connects the second client to the first server. In turn, the fabric controller disconnects the second client from the second server.

When the second server has more capacity, the second server is selected by the fabric controller, in step 422. In step 424, the fabric controller transmits the public address of the second server to the first client. In step 426 the fabric controller connects the first client to the second server. In turn, the fabric controller disconnects the first client from the first server. The method ends in step 428.

In summary, the cloud computing platform is configured to provide direct addressability and direct server return. The cloud applications executed in the cloud computing platform may connect multiple client devices to a single server. Additionally, the load balancer in the cloud computing platform may be bypassed on reply routes when the servers respond to communication messages from the client devices.

The foregoing descriptions of the embodiments of the invention are illustrative, and modifications in configuration and implementation are within the scope of the current description. For instance, while the embodiments of the invention are generally described with relation to FIGS. 1-4, those descriptions are exemplary. Although the subject matter has been described in language specific to structural features or methodological acts, it is understood that the subject matter defined in the appended claims is not necessarily limited to the specific features or acts described above. Rather, the specific features and acts described above are disclosed as example forms of implementing the claims. The scope of the embodiment of the invention is accordingly intended to be limited only by the following claims.

We claim:

1. A computer-implemented method to perform direct server return in a cloud computing platform, the method comprising:
   receiving a message addressed to a public interface of a load balancer connected to multiple servers;
   selecting one of the servers to process the message;
   modifying the message to include a media access control address of the selected server as the destination media access control address and retaining the internet protocol address of the load balancer as the destination internet protocol address of the message;
   transmitting the modified message to the selected server associated with the destination media access control address, wherein the server has a loopback interface configured to match the internet protocol address of the load balancer and is configured to communicate a reply to a source of the message without traversing the load balancer; and
   not responding to address resolution protocol requests that specify the internet protocol address of the load balancer even if the servers have a loopback interface configured to match the internet protocol address of the load balancer.

2. The computer-implemented method of claim 1, wherein the source is a client device of the cloud computing platform that generates the message and addresses the message to the load balancer.

3. The computer-implemented method of claim 2, wherein the client device is connected to a public network.

4. The computer-implemented method of claim 1, wherein the servers are physical servers.

5. The computer-implemented method of claim 1, wherein the servers are virtual servers.

6. The computer-implemented method of claim 1, wherein the selected server further comprises an interface to a private network and an interface to a public network.

7. The computer-implemented method of claim 1, wherein the load balancer responds to the address resolution protocol requests that specify the internet protocol address of the load balancer.

8. A computing device configured to provide direct addressability and direct server return, the computing device comprising:
   a group of servers configured to process one or more messages, wherein each server has a loopback interface, wherein the loopback interfaces are configured with the internet protocol address of a load balancer and each server in the group of servers is configured to ignore address resolution protocol requests that specify the internet protocol address of the load balancer even if the servers have a loopback interface configured to match the internet protocol address of the load balancer; and
   the load balancer configured to receive the one or more messages, to select a server from the group of servers that processes the one or more messages, to modify the destination media access control address to the media access control address of the selected server without altering the destination internet protocol address of the received one or more messages, and to transmit the modified one or more messages to the selected server.

9. The computing device of claim 8, wherein communication messages are tagged by one of a virtual machine switch or a top of rack switch.

* * * * *